(12) United States Patent
Johansson et al.

(10) Patent No.: US 7,992,898 B2
(45) Date of Patent: Aug. 9, 2011

(54) AIRBAG DEVICE

(75) Inventors: Jack Johansson, Landvetter (SE);
Rudiger Leibelt, Erdweg (DE); Harald Wolf, Stockdorf (DE)

(73) Assignee: Autoliv Development AB, Vargarda (SE)

( * ) Notice: Subject to any disclaimer, the term of this patent is extended or adjusted under 35 U.S.C. 154(b) by 292 days.

(21) Appl. No.: 11/992,941

(22) PCT Filed: Sep. 14, 2006

(86) PCT No.: PCT/EP2006/008967
§ 371 (c)(1),
(2), (4) Date: Apr. 1, 2008

(87) PCT Pub. No.: WO2007/039061
PCT Pub. Date: Apr. 12, 2007

(65) Prior Publication Data
US 2009/0140509 A1 Jun. 4, 2009

(30) Foreign Application Priority Data
Oct. 4, 2005 (DE) .................. 10 2005 047 606

(51) Int. Cl.
*B60R 21/16* (2006.01)
(52) U.S. Cl. .................. 280/743.1; 280/743.2
(58) Field of Classification Search ............. 280/730.1, 280/729, 743.1, 743.2
See application file for complete search history.

(56) References Cited

U.S. PATENT DOCUMENTS

| | | | | |
|---|---|---|---|---|
| 5,240,283 A * | 8/1993 | Kishi et al. | ..................... | 280/729 |
| 5,577,765 A * | 11/1996 | Takeda et al. | ................. | 280/729 |
| 6,419,262 B1 | 7/2002 | Fendt et al. | | |
| 6,457,742 B1 * | 10/2002 | Brucker | ..................... | 280/730.2 |
| 6,588,798 B2 * | 7/2003 | Bohn et al. | ................. | 280/743.1 |
| 6,773,027 B2 * | 8/2004 | Bohn et al. | ..................... | 280/729 |
| 6,802,534 B2 * | 10/2004 | Neupert | ..................... | 280/743.1 |
| 6,846,008 B2 * | 1/2005 | Kamiji et al. | ................. | 280/729 |
| 7,000,934 B1 * | 2/2006 | Capek | ............. | 280/234 |
| 7,073,818 B2 * | 7/2006 | Hasebe | ......................... | 280/729 |
| 7,195,275 B2 * | 3/2007 | Abe | .............................. | 280/729 |
| 7,347,445 B2 * | 3/2008 | Choi | .............................. | 280/729 |
| 7,648,158 B2 * | 1/2010 | Hasebe | ......................... | 280/729 |
| 7,673,901 B2 * | 3/2010 | Hanawa et al. | ............ | 280/743.1 |
| 2003/0230883 A1 | 12/2003 | Heym | | |

FOREIGN PATENT DOCUMENTS

| | | |
|---|---|---|
| DE | 197 03 945 A1 | 8/1998 |
| DE | 198-60 827 A1 | 7/2000 |
| DE | 199 32 696 C1 | 9/2000 |
| EP | 1364840 | 11/2003 |

OTHER PUBLICATIONS

International Search Report (English) and Written Opinion of the ISA (German) for PCT/EP2006/008967, mailed Dec. 6, 2006.

* cited by examiner

*Primary Examiner* — Toan C To
(74) *Attorney, Agent, or Firm* — Harness, Dickey & Pierce, P.L.C.

(57) ABSTRACT

An airbag device comprising an airbag made of a woven fabric which is fastened to a vehicle structure, in particular above a vehicle occupant, and which can be filled with gas by means of a gas generator and in the filled state extends in front of the vehicle occupant is characterized in that a cutout is provided in the head impact region of the airbag fabric which the head of the vehicle occupant can penetrate, and this cutout is closed by a cover that is decoupled from tensile stress in the airbag fabric.

24 Claims, 3 Drawing Sheets

Figure 3A:
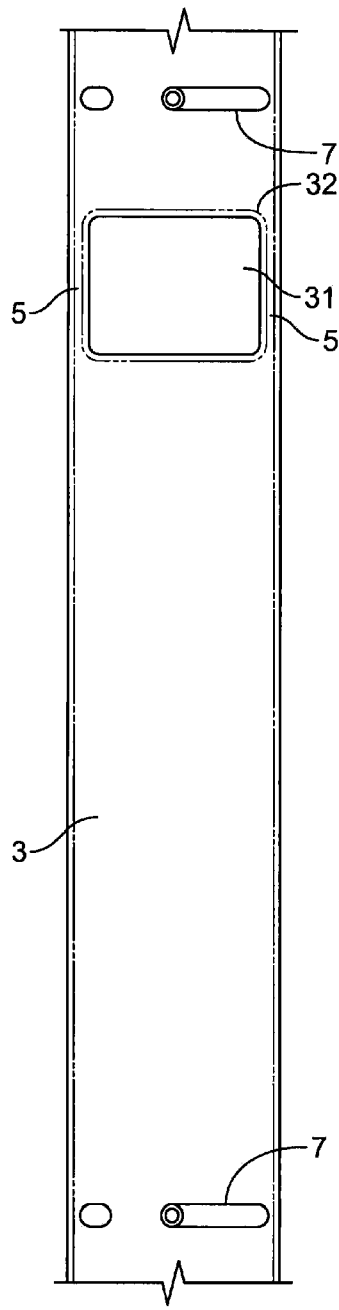

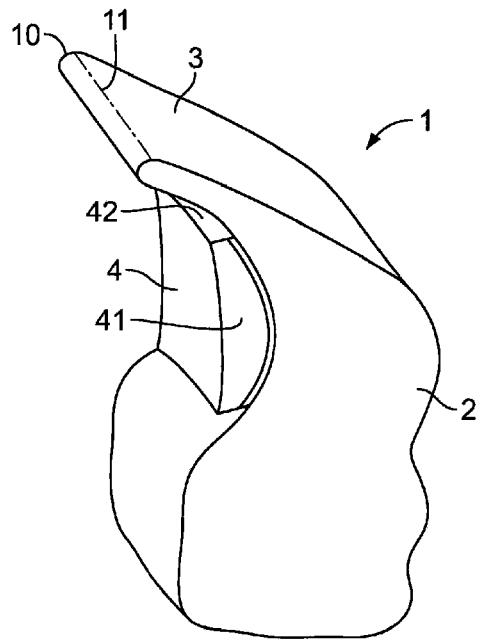
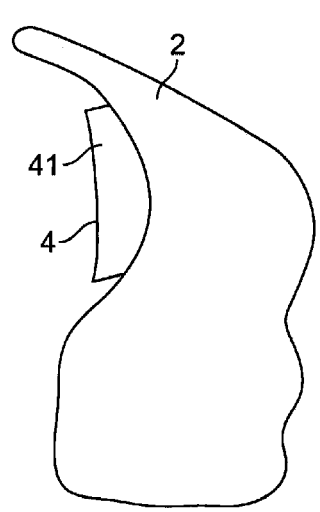
FIG. 1b    FIG. 1a
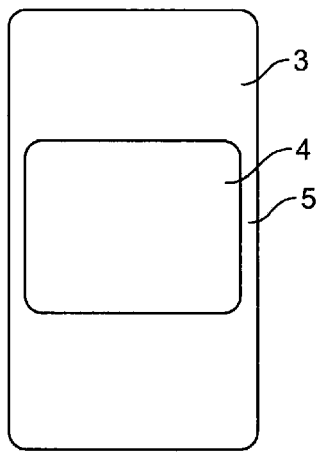
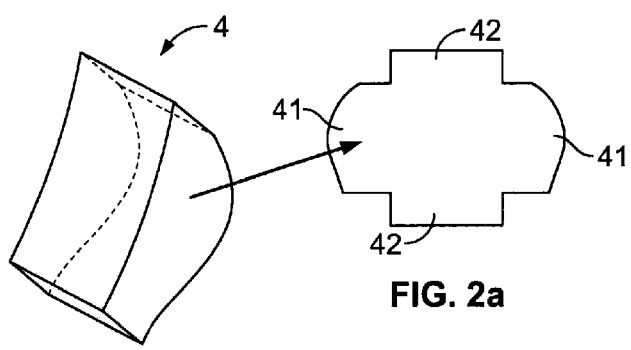
FIG. 1c    FIG. 2b    FIG. 2a

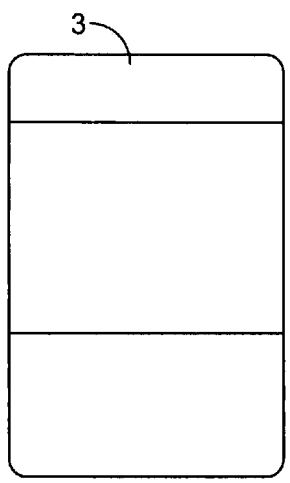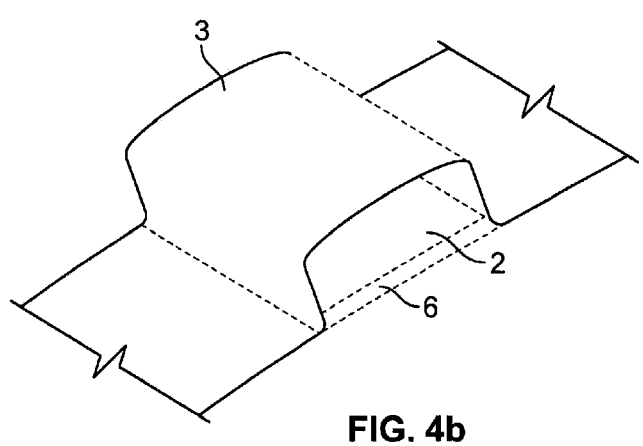
FIG. 4a
FIG. 4b

AIRBAG DEVICE

CROSS-REFERENCE TO RELATED APPLICATIONS

This application is a 371 National Stage of International application No. PCT/EP2006/008967, filed Sep. 14, 2006. This application claims priority to German Patent Application DE 10 2005 047606.6, filed Oct. 4, 2005, which application is herein expressly incorporated by reference.

FIELD

The invention relates to an airbag device comprising an airbag made of a woven fabric which is fastened to a vehicle structure and which can be filled with gas by means of a gas generator and which in the filled state extends in front of the vehicle occupant. The invention is particularly suited for motor vehicles such as passenger vehicles, trucks, or buses, and provides protection in particular in a head-on collision of the motor vehicle.

BACKGROUND

A restraint system for a head-on collision of a vehicle is known from DE 198 60 827 A1, having an airbag that is mounted at the vehicle roof and which unfolds in the manner of a curtain when corresponding sensor data are present. To ensure the positional stability of the unfolded airbag, a partial region of the front fabric section of the airbag is supported on the vehicle bodywork. For this purpose the configuration is chosen so that the airbag unfolds forward and downward along the upper region of the windshield, and then in the direction of the vehicle occupant. In one variant, a fillable curtain is provided on which a chest section and a head section are situated, each of which is separately connected to the curtain and separately fillable.

In a forward motion of the vehicle occupant as the result of a head-on collision, the airbag, which extends to the abdominal region of the vehicle occupant, is wedged between the thigh and the upper body and remains in a fixed position relative to the head. In addition, the airbag is fixed in place in the roof region of the vehicle, so that very high tensile stresses occur in the airbag fabric when the vehicle occupant penetrates the airbag. This results in a relatively hard impact and high strain on the head and neck, possibly even snapping the head backwards.

SUMMARY

To remedy this problem, it is known from the prior art to provide tear lines in the fastening region of the airbag so that the upper holding point breaks away. This provides positional stability for the airbag and reduces the safety for the vehicle occupants.

The object of the invention is to provide an improved airbag device which reduces head and neck strain and at the same time ensures positional stability of the airbag.

This object is achieved according to the invention by means of an airbag device having the features of claim 1. Advantageous embodiments and refinements of the invention are described in the subclaims.

The airbag device according to the invention, comprising an airbag made of a woven fabric which is fastened to a vehicle structure, in particular above the vehicle occupant, and which can be filled with gas by means of a gas generator and which in the filled state extends in front of the vehicle occupant, provides that a cutout is provided in the head impact region of the airbag fabric which the head of the vehicle occupant can penetrate, and this cutout is closed by a cover that is decoupled from tensile stress in the airbag fabric. As a result of the decoupling of the cover from the tensile stress present in the airbag fabric, it is possible for the head of the vehicle occupant to penetrate the cover or the volume of air formed by the cover without the head rebounding. The decoupling of the tensile stress within the airbag fabric prevents the head from striking a tightened or tightening fabric web and rebounding as from a trampoline. The entire airbag is stable as a result of the attachment that is maintained, in particular when the airbag is fastened above the vehicle occupant, thereby avoiding shifting of the filled airbag and thus risk of the airbag sliding past the vehicle occupant.

In one refinement of the invention, the cover is completely decoupled from the tensile stress in the remainder of the airbag fabric, so that the head which penetrates into the cushion is intercepted only by the gas pressure. A partial decoupling causes only selected regions of the cover to be decoupled from the tensile stress, or reduces the tensile stress which acts in the cover or is transmitted from the airbag fabric to the cover.

The cover is preferably provided in a fabric web which faces the vehicle occupant and constitutes the main fabric web of the airbag, which forms a loop and whose sides are closed off by correspondingly designed side webs.

The cover may be designed as a cushion which projects toward the vehicle occupant and which extends from the rest of the airbag, thus ensuring more rapid contact of the head with the airbag in the event of an accident. The protection of the vehicle occupant is thus further increased.

The cover may be fastened to, in particular sewn onto, the airbag as a separate sectional piece which covers the cutout. Alternatively, the cover is provided as part of a fabric web, for example the main fabric web, of the airbag, which is fastened to side webs of the airbag and in the region of the cover has a contour which faces the vehicle occupant The cushion is thus formed by the contour of the side webs; the tensile forces are absorbed via the side webs, and the greater length of the main fabric allows the head to be immersed in the cushion. This immersion occurs, solely against the interior gas pressure, as long as the additional material, i.e., the cushion material, is not pressed in so far that tensile stress likewise occurs in the fabric of the cover.

The dimensions of the cushion or of the covers are selected such that the head is able to penetrate with sufficient depth into the airbag to be appropriately intercepted. The necessary depth of penetration is a function of the allowable limit values, customary biometric data for the vehicle occupants, the interior gas pressure, and the severity of the impact. Design and dimensioning may be performed by use of statistical data and required limit values.

The cover also preferably is composed of a fabric, for example the same fabric as the airbag, when it is sewn onto the airbag as a separate element. Alternative materials may also be provided.

In one variant the cushion, which is formed by the main fabric web or by the separate sectional piece, extends over the entire width of the airbag in order to provide optimal protection in a collision, even for an atypical sitting position of the vehicle occupant.

To support the absorption of tensile forces by the airbag fabric and for decoupling of the cover from tensile forces in the remainder of the airbag fabric, tension bands spaced at a relatively large distance from one another may be provided on the cover on the side facing away from the vehicle occupant for assistance in stabilization of the overall airbag.

The airbag is preferably mounted above a vehicle occupant, for example on the roof structure or the roof lining of the vehicle, and in the unfolded state preferably extends to the abdominal region of the vehicle occupant. Alternatively, it is possible for the airbag to protect only the head region.

DRAWINGS

Figure 3B:
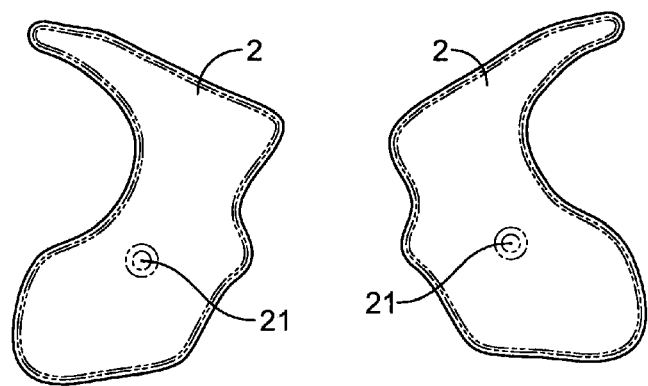

Exemplary embodiments of the invention are explained in greater detail below with reference to the accompanying figures, which show the following:

FIGS. 1a-1c show a first variant of the airbag device;
FIGS. 2a and 2b show detailed illustrations of a cover;
FIGS. 3a and 3b show sectional pieces of side regions and of a fabric web; and
FIGS. 4a and 4b show illustrations of one variant of the airbag device.

DETAILED DESCRIPTION

FIG. 1a shows a perspective oblique top view of an airbag device, comprising an airbag 1 which at its upper end 10 may be fastened to a vehicle structure, in particular a motor vehicle roof. When corresponding sensor data are present the airbag 1 of the airbag device may be filled with gas by means of a gas generator, not illustrated. The airbag 1 is composed of fabric sectional pieces 2, 3, 4, whereby side webs 2 and a main fabric web 3 surrounding the contour of the side webs 2 provide the basic shape of the airbag 1. Provided in the main fabric web 3 in the region of head impact in a possible head-on collision is a cutout 31, illustrated in FIG. 3a, which is covered by a cover 4. The cover 4 extends from the contour of the side webs 2, starting from the surface of the main fabric web 3, in the direction of the vehicle occupants, the depth of the cushion formed by the cover 4 being determined by the dimensions of the side and end faces 41, 42. In the upper fastening region the main fabric web 3 is closed by a seam 11, thus forming a loop.

FIG. 1b shows a side view of the airbag 1 of FIG. 1a. On the contour of the airbag 1 it is seen that the depth is greater in the abdominal region than in the head impact region. The cover 4 of the cutout (not illustrated) with the side sectional piece 41, which extends beyond this contour of the side webs 2 in the direction of the vehicle occupants (not illustrated), is visible. The cushion 4 extending in the direction of the vehicle occupants allows rapid contact of the vehicle occupant with the airbag 1, thereby increasing the efficiency of the airbag 1.

The top view of the airbag 1, illustrated in FIG. 1c from the viewpoint of a vehicle occupant, shows that the cover 4 is mounted on the main fabric web 3, a fabric strip 5 being present on each side of the cover 4. These fabric strips 5 are used for absorbing tensile forces occurring within the fabric strip [sic; main fabric web] 3 when the airbag 1 is wedged between the upper body and the thighs of the vehicle occupant. These tensile forces are not transmitted to the cover 4, which is designed in the form of a cushion and is decoupled from these tensile forces acting in the fabric. FIGS. 2a and 2b show a detailed view of the cover 4, which is composed of a fabric sectional piece and whose side and end faces 41, 42 are folded up and sewn together to form the hood-like cover 4. The side faces 41 have a shape corresponding to the contour of the side webs 2, which allows them to be sewn or glued to the main fabric web 3. Together with the side webs 2 and the main fabric web 3 the cover 4 forms the essentially closed airbag 1, which optionally has ventilation openings.

The sectional pieces of the side webs 2 and of the main fabric web 3 are illustrated in FIGS. 3a and 3b. FIG. 3a shows the cutout 31 in the essentially rectangular sectional piece of the main fabric web 3. A fastening seam 32 for the cover 4 is also shown. Fabric strips 5 are provided on each side of the cutout 31 which ensure dimensional stability even when tensile forces are transmitted. These fabric strips may be sewn to the narrow sides of the sectional piece of the main fabric web 3, holding devices 7 being provided for a gas generator, not illustrated. Provided along the longitudinal sides of the sectional piece are seams for connecting to the side sections 2, shown in FIG. 3b. The side webs 2 form the shape of the airbag 1 in the direction of travel, and in the installed and inflated state extend essentially parallel to one another. Ventilation openings 21 may be accommodated in the side webs 2.

An alternative design of the airbag 1 is shown in FIGS. 4a and 4b, in which the side webs 2 have a contour in the head impact region which projects in the direction of the vehicle occupant. The side webs 2 thus assume the function of the side faces 41 of the separate fabric sectional piece from FIG. 1a. The cutout 31 once again extends over the entire width of the airbag 1, as the result of which a separate sectional piece according to FIGS. 2a and 2b is omitted, and the fabric web 3 may be provided in a continuously circumferential manner around the side sections 2. For stabilization of the airbag 1, tension bands 6 may be provided behind the cushion, i.e., the protrusion facing the vehicle occupants, which absorb any tensile forces that occur. The remainder of the tensile forces are absorbed via the side webs 2.

These embodiments share the common feature that the fabric stress in the head impact region is interrupted, thus allowing the cushion formed in this region to press inwardly in the direction of the airbag 1. The fabric in the head impact region is decoupled from tensile stresses which may result from the two fixed attachment points at the wedge region between the thighs and upper body as well as the fastening point in the roof structure upon penetration by the vehicle occupant, and the head impact region therefore has a soft, flexible design. As a result, the head and neck of the vehicle occupant are subjected to less strain upon immersion in the airbag 1 when a vehicular collision occurs. The airbag 1 may also remain fastened in the roof region of the vehicle in the unfolded state; at the same time the airbag 1 is fixed in place between the upper body and thighs of the vehicle occupant so that the overall position of the airbag 1 is stable. However, the head of the vehicle occupant can still penetrate deeply into the airbag 1 during a head-on collision without this motion being impeded by tensile stresses within the fabric. The depth of penetration is determined by the dimensions of the cover 4 or the projections in the contour of the side webs 2. Provided that the cutout in the fabric is sufficiently large, the head of the vehicle occupant is able to penetrate very deeply into the airbag 1, optionally up to the point of an indentation which corresponds to the protrusion in the unfolded state.

This design allows the airbag 1 to be directly filled by the gas generator without the connection of lines or the like, which would reduce the stability and increase the filling time.

The invention claimed is:
1. An airbag device comprising:
an airbag made of a woven fabric for fastening to a vehicle structure, the airbag operable in a filled state to extend in front of a vehicle occupant, the airbag including a cutout in a head impact region of the fabric for receiving a head of the vehicle occupant; and a cushion that is substantially decoupled from tensile stress in the fabric, the cushion secured to the airbag and disposed in the cutout.

2. The airbag device according to claim 1, wherein the cushion is completely decoupled from the tensile stress in the remainder of the airbag fabric.

3. The airbag device according to claim 1, wherein the cushion includes a fabric web which faces the vehicle occupant.

4. The airbag device according to claim 1, wherein the cushion projects toward the vehicle occupant.

5. The airbag device according to claim 1, wherein the cushion is fastened to the airbag as a separate sectional piece.

6. The airbag device according to claim 3, wherein the cushion is part of the fabric web of the airbag, which is fastened to a pair of side webs of the airbag and proximate the cover has a contour which faces the vehicle occupant.

7. The airbag device according to claim 1, wherein the cushion is composed of a woven fabric.

8. The airbag device according to claim 4, wherein the cushion extends over a width of the airbag.

9. The airbag device according to claim 1, further comprising tension bands for absorption of tensile forces in the airbag fabric.

10. An airbag device comprising an airbag made of a woven fabric for fastening to a vehicle structure, the airbag operable in a filled state to extend in front of a vehicle occupant, the airbag including a cutout in a head impact region of the fabric for receiving a head of the vehicle occupant, the cutout closed by a cover that is substantially decoupled from tensile stress in the fabric;
wherein the airbag is mountable above a vehicle occupant.

11. The airbag device according to claim 1, wherein the airbag extends to an abdominal region of the vehicle occupant in an unfolded state.

12. The airbag device according to claim 5, wherein the cover is sewn to the airbag.

13. The airbag device according to claim 10, wherein the airbag is mountable to a roof lining of a vehicle.

14. The airbag device according to claim 10, wherein the tension bands are provided on a side of the cover facing the vehicle occupant.

15. An airbag device comprising:
an inflatable airbag operable in a filled state to extend in front of a vehicle occupant, the airbag including a cutout in an impact region; and
a cushion disposed in the cutout, the cushion having a rear surface, a front surface and a pair of side surfaces;
whereby an interior of the airbag is sealed from the cover and tensile forces acting on the airbag upon inflation are not transferred to the cover.

16. The airbag device of claim 15, wherein the cushion includes a fabric web which faces the vehicle occupant.

17. The airbag device of claim 15, wherein the cushion which projects toward the vehicle occupant.

18. The airbag device of claim 15, wherein the cushion is fastened to the airbag as a separate sectional piece.

19. The airbag device of claim 1, wherein the cushion is a three dimensional structure.

20. The airbag device of claim 1, wherein the cushion has a rear surface proximate to and generally conforming with a portion of the cutout.

21. The airbag device of claim 1, wherein the cushion has a convexly curved rear surface.

22. The airbag device of claim 15, wherein the cushion is a three dimensional structure.

23. The airbag device of claim 15, wherein the cushion has a rear surface proximate to and generally conforming with a portion of the cutout.

24. The airbag device of claim 15, wherein the cushion has a convexly curved rear surface.

* * * * *